United States Patent

[11] 3,566,242

[72] Inventor: Malcolm Williams, Solihull, Warwickshire, England
[21] Appl. No.: 776,896
[22] Filed: Nov. 19, 1968
[45] Patented: Feb. 23, 1971
[73] Assignee: Joseph Lucas (Industries) Limited, Birmingham, England
[32] Priority: Dec. 18, 1967
[33] Great Britain
[31] 57326/67

[54] BATTERY CHARGING SYSTEMS
6 Claims, 1 Drawing Fig.

[52] U.S. Cl. .................................................. 320/9, 320/6, 320/10, 320/21, 320/31
[51] Int. Cl. .................................................. H02j 7/00
[50] Field of Search ...................................... 320/3, 6, 9—11, 13, 15, 21; 323/27—29, 31—34, (P.W.)

[56] References Cited
UNITED STATES PATENTS
3,383,584  5/1968  Atherton ..................... 320/TD(UX)
3,392,317  7/1968  Eberts et al. .................. 320/TD(UX)

FOREIGN PATENTS
826,783  1/1960  Great Britain ................ 323/P.W.(UX)

Primary Examiner—William M. Shoop, Jr.
Assistant Examiner—John M. Gunther
Attorney—Holman & Stern

ABSTRACT: In a battery charging system in which a DC source, which may itself be a battery, is used to charge the battery, the voltages of both the DC source and the battery can vary, voltage control is effected by turning a switch controlling flow of current from the DC source to the battery on and off for periods of time determined by the voltages of the DC source and battery. The on period of the switch is inversely related to the voltage of one of the sources, and the off period of the switch is directly related to the voltage of the other source.

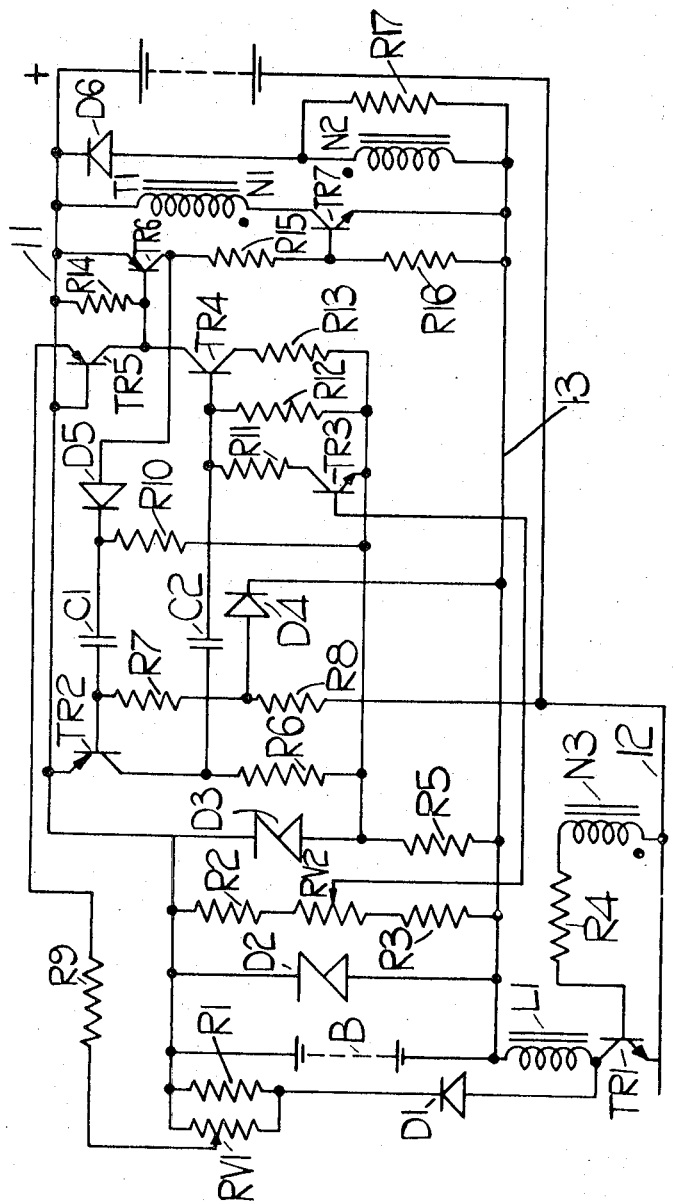

BATTERY CHARGING SYSTEMS

In certain applications it is necessary to charge a first battery from a second battery, where the second battery has a voltage which varies in a manner unrelated to the voltage of the battery being charged. Such an application may arise in an electrically driven road vehicle having a master battery which drives the vehicle, and a second battery which operates ancillary equipment on the vehicle.

A battery charging system according to the invention includes means for turning a switch controlling current flow from the second battery to the first battery on and off for periods of time determined by the voltages of the batteries, the on period of the switch being inversely related to the voltage of one of the batteries and the off period of the switch being directly related to the voltage of the other batteries, so that the voltage to which the first battery is charged is regulated. The accompanying circuit diagram illustrates one example of the invention. Referring to the drawing, a battery, which may be on an electrically driven road vehicle, supplies power to positive and negative lines 11, 12 and, the battery B to be charged has its positive terminal connected to the line 11, and its negative terminal connected to a supply line 13. The line 13 is connected through an inductor L1 to the collector of an NPN transistor TR1, the emitter of which is connected to the line 12 and the base of which is connected to the line 12 through a resistor R4 in series with a secondary winding N3 of a transformer T1. The transformer T1 has a primary winding, which is seen towards the right hand side of the drawing, with one end connected to the line 11 and its other end connected to the collector of an NPN transistor TR7, the emitter of which is connected to the line 13. The transformer T1 has a further secondary winding N2, one end of which is connected to the line 13 and the other end of which is connected to the line 11 through the anode-cathode path of a diode D6. The winding N2 is bridged by resistor R17.

The base of the transistor TR7 is connected to the line 13 through a resistor R16, and is further connected through a resistor R15 to the collector of a PNP transistor TR6, the emitter of which is connected to the line 11. The base of the transistor TR6 is connected to the line 11 through a resistor R14, and is further connected to the collector of PNP transistor TR5, the base of which is connected to the line 11. The collector of the transistor TR5 is also connected to the emitter of a PNP transistor TR4, the collector of which is connected to the line 13 through resistors R13, R5 in series. The base of the transistor TR4 is connected to one end of the resistor R12, and is also connected through a resistor R11 to the collector of a NPN transistor TR3. The other end of the resistor R12 and the emitter of the transistor TR3 are both connected to the line 13 through the resistor R5, which in turn is connected across the lines 11, 13 in series with a Zener diode D3.

The base of the transistor TR4 is further connected through a capacitor C2 to the collector of a PNP transistor TR, the emitter of which is connected to the line 11, the collector of which is connected to the line 13 through a resistor R6 and the resistor R5 in series, and the base of which is connected to the collector of the transistor TR6 through a capacitor C1 and the cathode-anode path of a diode D5 in series. The junction of the capacitor C1 and the diode D5 is connected to the line 13 through a resistor R10 in series with the resistor R5, and the base of the transistor TR2 is connected to the line 12 through resistors R7, R8 in series, the junction of the resistors R7, R8 being connected to the line 13 through the anode-cathode path of a diode D4.

Connected across the lines 11, 13 in parallel are a Zener diode D2, and a series circuit including resistors R2, RV2, R3. A variable point on the resistor RV2 is connected to the base of the transistor TR3.

The collector of the transistor TR1 is connected through the anode-cathode path of the diode D1 and the resistor R1 in series to the line 11, the resistor R1 being bridged by a resistor RV1. A variable point on the resistor RV1 is connected through the resistor R9 to the emitter of the transistor TR5.

The basic action of the circuit is to turn the transistor TR1 on and off, so that the current flowing to charge the battery B varies between a maximum level and a minimum level. The length of time for which the transistor TR1 is on depends on the voltage between the lines 11, 12 and decreases as this voltage increases. The length of time for which the transistor T1 is off depends upon the state of charge of the battery B itself, and increases as the voltage of the battery B increases. Thus, neglecting for the moment the voltage of the battery B, then voltage regulation is achieved by virtue of the fact that the bigger the voltage between the lines 11, 12 the less the time for which the battery B is charged. Likewise, assuming a constant voltage between the lines 11, 12 then voltage regulation is achieved in accordance with the actual voltage of the battery by increasing the off period as the voltage of the battery increases. These two factors in combination provide regulation which in practice is found to be quite satisfactory. An alternative of course would be for the on period to be inversely dependent on the battery voltage and for the off period to be directly dependent on the voltage between the lines 11, 12.

Referring now to the operation in detail, the transistors TR2 and TR6 constitute a conventional multivibrator circuit, with the transistor TR4 acting as an emitter-follower coupled to the transistor TR6 to increase the amplification thereof. The circuit operates in the usual way, so that when transistor TR2 is on the transistor TR6 and the transistor TR4 are off, and when transistor TR2 is off, the transistors TR6 and TR4 are on. When the transistor TR6 is on, base current is supplied to the transistor TR7, which conducts so that the transformer T1 applies a driving bias to the transistor TR1, which conducts so that current flows to charge the battery B through the inductor L1. The inductor L1 limits the rate of rise of current in the battery B. When the multivibrator is in its alternative state with the transistor TR6 off, the transistor TR7 is off and so the transistor TR1 is off. Current now flows from the inductor L1 through the diode D1 and resistor R1 to charge the battery B, the level of current now falling to a lower level than when the transistor TR1 is on. The period for which the transistor TR6 is on is determined by the Zener diode D3, the capacitor C1, the resistors R7 and R8 and the voltage between the lines 11, 12. As the voltage between the lines 11, 12 is reduced, the time taken for the capacitor C1 to discharge increases, and since the capacitor C1 must be discharged before the multivibrator reverts to its other state with transistor TR2 conducting, it follows that the on time of the transistor TR1 increases as the voltage between the lines 11, 12 decreases.

The time for which the multivibrator is in its alternative state with the transistor TR2 conducting, that is to say with the transistor TR1 off, is determined by the capacitor C2 and the parallel combination of resistor R12 and the effective resistance value of the series circuit including the resistor R11. The effective value of the series circuit including the resistor R11 is determined by the state of conduction of the transistor TR3, which in turn is dependent upon the voltage between the lines 11, 13, that is to say the voltage of the battery B. As the voltage of the battery B decreases, the transistor TR3 conducts more, so that the combined resistance of the resistors R11 and the collector-emitter path of the transistor TR3 goes down, permitting the capacitor C2 to be discharged more quickly so that the off period is reduced.

The purpose of the transistor TR5 is to ensure that transistor TR6 remains off until the current flowing through the resistor R1 falls below a predetermined level which is set by the variable tapping on resistor RV1. Without this provision, it is possible for the mean current flowing to charge the battery B to reach an undesirably high level.

The purpose of the diode D4 is to restrict the amount by which the on period of the transistor TR1 can be changed, and to ensure that no damage will result if the supply between the lines 11, 12 is open-circuited. The zener diode D2 prevents surges in such a condition, the breakdown voltage of the Zener diode D2 being chosen to be greater than the battery voltage.

The winding N2 on the transformer ensures that the flux in the transformer is reset to zero when the transistor TR1 is off, and also ensures that the transistor TR1 is turned off quickly by providing reverse drive to the base of the transistor TR1.

The resistor R9 limits the current that can be taken from the emitter of the transistor TR5 when the current flowing through the resistor R1 is above the limit set by the tapping on the resistor RV1. The resistor R9 also assists in temperature compensation, and could if necessary be a temperature dependent resistor having opposite temperature characteristics to the base-emitter of the transistor TR5.

The didoe D5 prevents charging of the capacitor C1, via R15 and R16 thereby preventing the charging current of C1 from reducing the rate at which the transistor TR7 turns off, and at the same time ensuring that C1 is charged to a steady potential D3, rather than a varying potential, battery voltage.

I claim:

1. A battery charging system for charging a first battery from a second battery, including means for turning a switch controlling current flow from the second battery to the first battery on and off, said means incorporating a timing control sensitive to the voltages of the batteries for maintaining a switch on for a period of time inversely related to the voltage of one of the batteries and for maintaining the switch off for a period of time directly related to the voltage of the battery, so that the voltage to which the first battery is charged is regulated 2. A system as claimed in claim 1 in which the on period is inversely elated to the voltage of the second battery and the off period is directly related to the voltage of the first battery.

3. A system as claimed in claim 1 including means for ensuring that the off period has a predetermined minimum level.

4. A system as claimed in claim 1 including means for determining upper and lower limits for the on period.

5. A system as claimed in claim 1 including an inductor in series with said switch and the battery.

6. A system as claimed in claim 5 including a circuit whereby energy stored in the inductor during each on period is utilized to charge the battery during each off period.